UNITED STATES PATENT OFFICE.

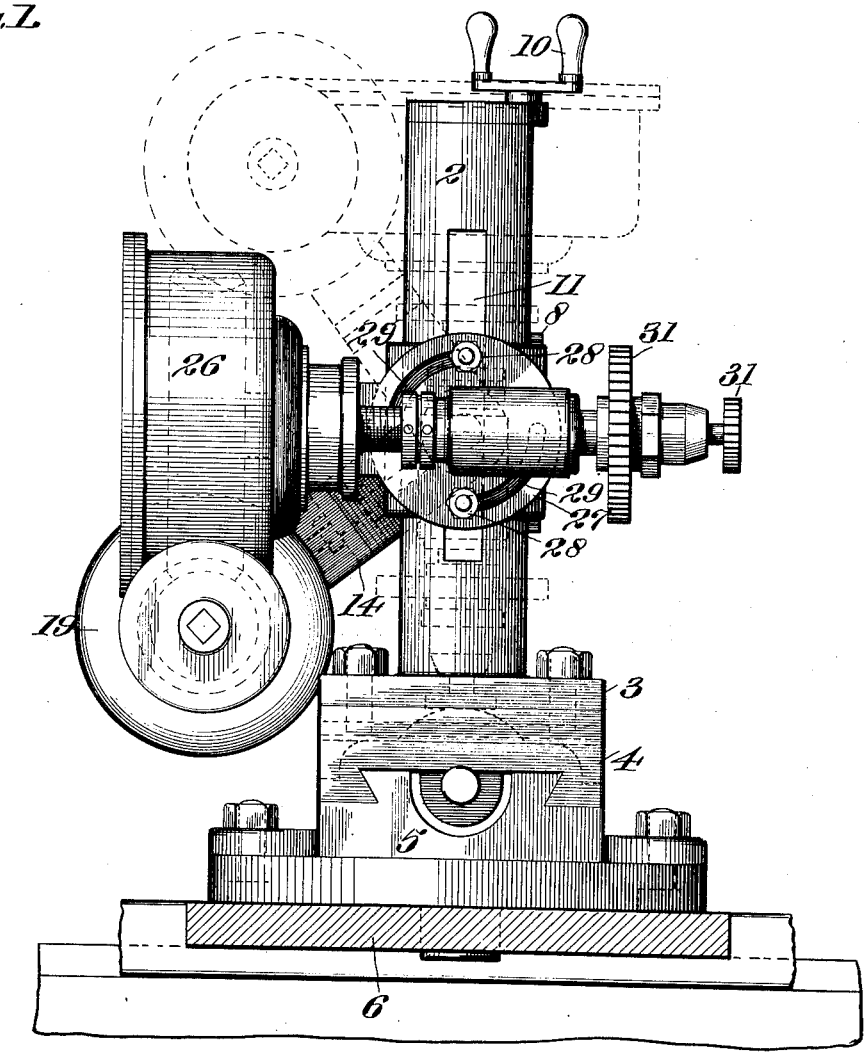

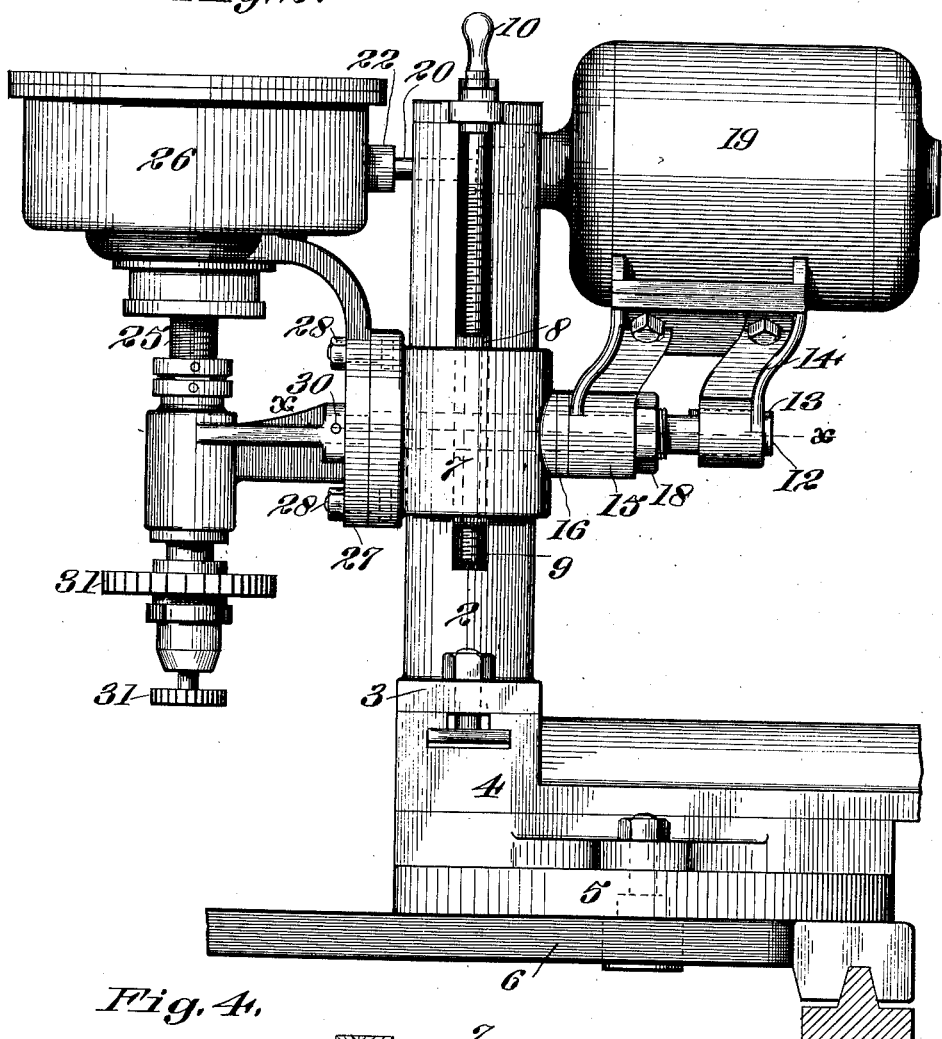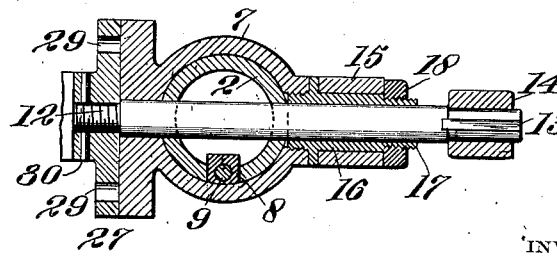

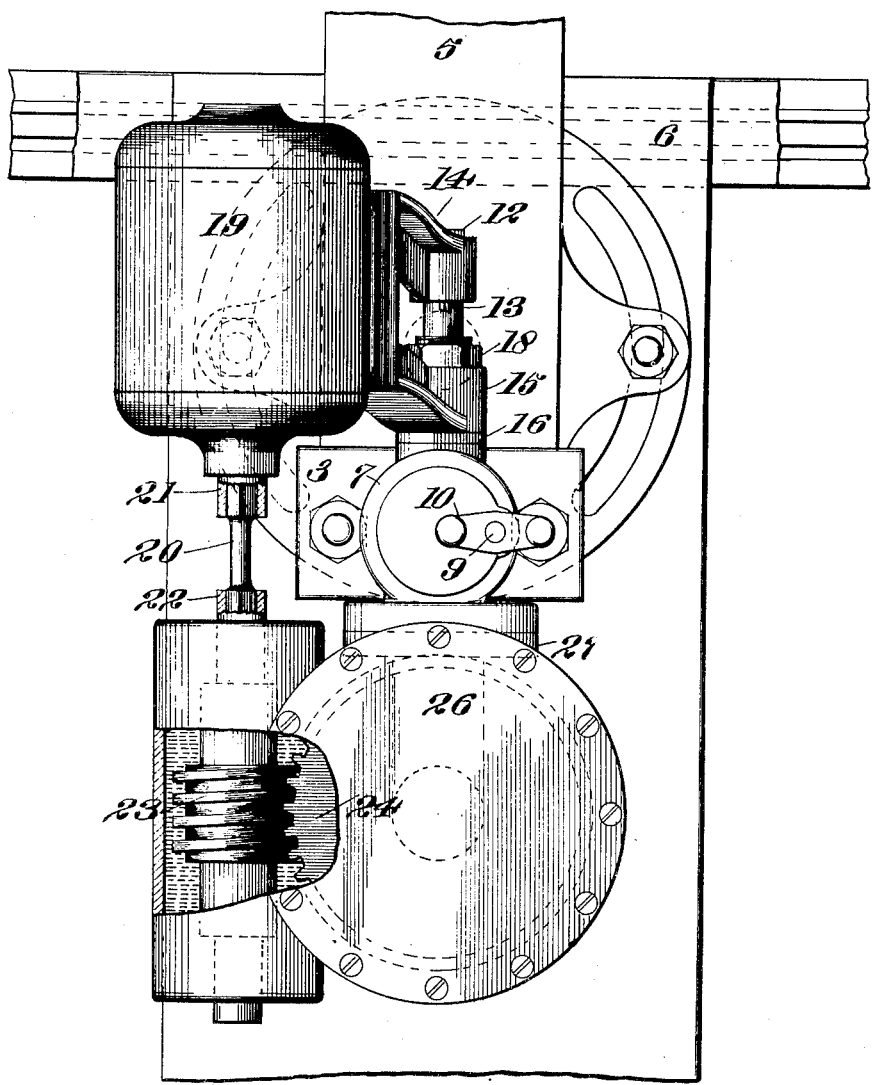

GEORGE E. MILLER, OF OAKLAND, AND EDWIN B. CANTRELL, OF SAN FRANCISCO, CALIFORNIA.

PORTABLE UNIVERSAL MILLING-MACHINE.

1,107,221.  Specification of Letters Patent.  Patented Aug. 11, 1914.

Application filed January 21, 1913. Serial No. 743,284.

*To all whom it may concern:*

Be it known that we, GEORGE E. MILLER, of Oakland, county of Alameda, State of California, and EDWIN B. CANTRELL, of the city and county of San Francisco, State of California, citizens of the United States, have invented new and useful Improvements in Portable Universal Milling-Machines, of which the following is a specification.
This invention relates to milling machines.

The object of the present invention is to provide a compact, electro-motor driven milling machine in which the cutter shaft is adapted to be adjusted in a vertical plane, or a horizontal plane, and adjusted at diverse angles for the purpose of making various cuts as may be required on a piece to be milled or otherwise machined.

An important object of the present invention is to provide in a milling machine means connecting an electric motor with a milling or other tool shaft to be driven by the motor and providing a rigid connection between the motor support and the tool shaft support, whereby these two elements will at all times, during various adjustments of the cutter with relation to the work, move with rigid, inflexible relation to each other, thereby avoiding the tendency to create undue friction in the running parts by the disalinement of the motor shaft with the transmitting gear of the cutter shaft during these various adjustments.

The invention consists of the parts and the construction and combination of parts as hereinafter more fully described and claimed, having reference to the accompanying drawings, in which—

Figure 1 is a front elevation of the milling machine showing the cutter mechanism in horizontal plane. Fig. 2 is a side elevation showing the cutter shaft arranged in vertical position. Fig. 3 is a plan view of Fig. 2. Fig. 4 is a horizontal section on line X—X, Fig. 2.

In its present embodiment our invention consists of a suitable post, column or standard 2, having an appropriate base portion 3 adapted to be bolted to the work to be machined or cut, or, as in the present case, attached to a cross feed slide 4. The slide 4 is mounted on a pivot block 5 which in turn is supported upon a carriage 6 of a machine tool.

Slidable upon the column 2 is a slide 7 having a snug bearing on the column and being movable vertically thereon by a suitable vertical feed, consisting of a key 8 engaged by a feed screw 9. The feed screw 9 extends upwardly through the post and has a crank or handle 10 at the top which, when turned, raises or lowers the slide 7. The post 2 is slotted longitudinally through its diameter for a considerable length, as at 11, and extending through this slot is a pivot bolt or shaft 12, one end of which is provided with a key 13 engageable with a bracket 14 supported on the adjacent end of the shaft 12. The bracket also has a hub portion 15 turnably fitting a rigid bushing or journal 16, Fig. 4, projecting transversely and horizontally from the slide 7; the outer end of the journal 16 being threaded, as at 17, for the reception of a collar or nut 18 which is screwed up after the bracket 14 has been assembled upon the extending end of the shaft 12. The collar or hub 15 is freely turnable on its journal 16, and, since the bracket 14 is keyed to the pivotal shaft 12, these two elements will turn in unison.

Supported upon the bracket 14 is a suitable type of electric motor 19, from which projects a connector 20, one end of which is seated in a socket 21, Fig. 3, of the motor shaft and the other end of the connector is seated in a socket 22 of a worm 23 forming a part of a transmitting mechanism, including a worm gear 24 which is fast upon the adjacent end of a cutter or driven shaft 25. The transmitting gears 23—24 are suitably supported and housed in an oil-tight casing 26 which is rigidly, removably and adjustably secured to the adjacent face 27 of the slide 7 which is on the opposite side of the post 2 than the motor bracket 14. The housing is fastened to the face 27 by means of bolts 28, the heads of which may sweep in circular grooves 29 in the face 27.

For the purpose of rigidly connecting the motor 19 and the transmission gear housing 26, we have provided the transverse axis or pivot shaft 12, on one end of which the motor-carrying bracket is keyed. Upon the other end the casing 26 is rigidly pinned, as at 30, Fig. 4, so that for every angular adjustment of the casing 26, with relation to the face plate 27 of the slide 7, the shaft 12 will turn evenly and carry the motor bracket 14 and the motor through precisely the same degree of angular movement, thus entirely eliminating the possibility of disalinement of the axis of the worm 23, with relation to the axis of the motor shaft.

It is understood that the driven shaft 25 of the machine can be provided with any desirable type of cutter or tool, as the work in hand may necessitate. In the present instance we have shown milling cutters 31 of the ordinary type.

From the foregoing it will be seen that by the present milling machine we are enabled to employ a high speed electric motor, so connected to a driven shaft 25 that the speed of the latter can be much reduced over the speed of the motor. By introducing a rigid connection between the reducing gearing and the motor we are enabled to make diverse adjustments of the position of the driven shaft, with relation to the work to be cut, by providing a rigid connection between the motor and the gear train which will insure the positive and uniform adjustment of the motor and the gear train whenever the change of position of the cutter shaft is desired.

By means of the slide 7 the tool can be moved in a vertical plane along the piece being machined, and by means of the cross feed slide 4 the cutting tools can be shifted horizontally along the work being machined, or, if desired, the cutter can be moved through an arc by means of the pivotal block 5 turning about its central axis. In addition to these several distinct feeds of the cutters or cutter we are enabled by our present invention to angularly adjust the cutter shaft 25, with relation to the post 2, so that the cutters will operate at an angular position upon the work; this angular adjustment being provided by means of the pivot shaft 12 which extends through the post 2 in the slot 11 and upon which shaft the gear casing 26 is rigidly secured. The position of the parts is rendered firm by the tightening up of the bolts 28, after the shaft 25 has been adjusted to the desired angular position.

Since the transmitting gear and cutter shaft are on one side of the post 2 and the motor 19 and its bracket 14 are on the other side of the post 2, the load of the movable parts of the post 2 is nicely balanced, so that the slide 7 can be readily adjusted vertically along the post without any binding action, such as would occur if the loads of the parts were not approximately evenly balanced upon each side of the slide 7. This balancing of the load and the rigid connection of the motor bracket and motor with the transmitting gear case and the shaft 25 insure the uniform angular movement of the motor and the gear case 26, when these parts are turned with relation to the post 2 about the axis of the pivotal connection or shaft 12 to which these elements are rigidly though removably and adjustably connected.

Having thus described our invention, what we claim and desire to secure by Letters Patent is—

1. A portable, universal milling machine comprising a post or column having a longitudinally extending slot, a slide adjustable upon and along said column, a motor supported upon one side of the slide, a transmitting gearing and its case, a drive connection between said motor and the transmitting gear supported on the slide, and a member extending through the slot in the column and having rigid connection with the motor and with said case, whereby these parts will move in unison in an arc about the axis of said member.

2. A portable, universal milling machine comprising a post or column having a longitudinally and diametrically extending slot, a slide adjustable upon and along said column, a motor supported upon one side of the slide, a transmitting gearing and its case, a drive connection between said motor and the transmitting gear supported on the slide, and a member extending through the slot in the column and having rigid connection with the motor and with said case, whereby these parts will move in unison in an arc about the axis of said member.

3. A portable tool comprising a post or column having a longitudinal slot extending therethrough, a slide adjustable upon and along said column, a motor turnably supported on one side of the slide, a transmitting gear and a driven shaft supported on the opposite side of the slide, a driving connection between said motor and the transmitting gear, and a connection between said motor and the transmitting gear passing through said slot, whereby the motor and said gear will move uniformly in an arc about the axis of said connection.

4. A portable, universally adjustable tool comprising a post or column, a slide adjustably fitting said column, means for moving the slide along and holding the same in adjusted position thereon, a motor turnably supported on one side of the slide, a transmission gearing turnably supported upon the opposite side of the slide, said post having a longitudinal slot extending therethrough, a driving connection between the motor and the transmission gearing, and a pivotal connection extending through said slot and rigidly secured to the motor and to the transmission gearing and turnably mounted in the slide so as to move uniformly therewith along the column and whereby the relative position of the motor and the transmission gearing is maintained uniform when the parts are adjusted in an arc with relation to the slide.

5. In a portable milling machine the combination with an adjustable support, of a post or column removably attachable to said support, a slide mounted on said post, a means for adjusting and holding the same in a given position thereon, said slide having a journal projecting transversely from one side, a face plate with its plane parallel to the axis of the post on the opposite side, said post having a longitudinal slot extending transversely therethrough, a shaft turnably supported in the slide and extending through the slot in the post, a member turnably adjustable upon the face plate and rigidly connected with the contiguous end of the shaft, a transmitting mechanism mounted upon said member, a bracket rigidly connected to the opposite end of the turnable shaft and having a portion turnably fitting upon the journal projecting from the contiguous end of the slide, a motor mounted upon said bracket, a driving connection between said motor and the transmitting mechanism, said motor and said mechanism moving uniformly and rigidly in an arc about the axis of the turnable shaft, and a cutter shaft driven by said transmitting mechanism.

6. In a portable milling machine, a post or column, a slide mounted on said post, a means for adjusting and holding the same in a given position thereon, said slide having a journal projecting transversely from one side, a face plate with its plane parallel to the axis of the post on the opposite side, said post having a longitudinal slot extending transversely therethrough, a shaft turnably supported in the slide and extending through the slot in the post, a member turnably adjustable upon the face plate and rigidly connected with the contiguous end of the shaft, a transmitting mechanism mounted upon said member, a bracket rigidly connected to the opposite end of the turnable shaft and having a portion turnably fitting upon the journal projecting from the contiguous end of the slide, a motor mounted upon said bracket, a driving connection between said motor and the transmitting mechanism, said motor and said mechanism moving uniformly and rigidly in an arc about the axis of the turnable shaft, and a cutter shaft driven by said transmitting mechanism.

7. In combination with the carriage of a machine tool, a turnable support, a column adjustably secured thereto, a slide adjustable along the column, said slide having a face plate with its surface parallel to the axis of the column, a motor mounted upon the slide for movement therewith, a journal member turnably adjustable upon the face plate of the slide, a cutter shaft in said journal, reduction gearing connecting the motor and said shaft, and means for moving the slide along the column and holding the same in predetermined position thereon, the elements of the combination coöperating to permit universal movement of the cutter shaft.

8. A universal milling machine comprising a slide post attachable to a suitable support, a slide fitting the post, a screw mechanism on the post for moving the slide, said slide having a face plate at one side, an angularly movable journal member bearing against said face, and means for fixing it thereon, a shaft mounted in said member and with its axis substantially parallel with the plane of the axis of the column, and a motor on the slide with connections for driving the shaft.

9. In a portable milling machine, a cutter shaft, means for holding it tilted angularly in one plane, said means including a journal with a clamp plate and a slide coöperable therewith, means for moving the slide, a support for the slide and said means, said support having means for attachment to a suitable motor on the slide, and connections extending transverse the support for imparting power from the motor to the shaft.

10. A portable, universal milling machine comprising a tool shaft, a column, a motor for driving the shaft, and means for permitting linear and circular movements in a horizontal plane and angular and linear movements in a vertical plane of the cutter shaft, said means comprising horizontally movable supports for the column, and a slide adjustable on the column carrying the motor and shaft and having a relatively turnable part.

In testimony whereof we have hereunto set our hands in the presence of two subscribing witnesses.

GEORGE E. MILLER.
EDWIN B. CANTRELL.

Witnesses:
W. W. HEALEY,
ZOE HARRISON.